US 7,248,993 B2

(12) United States Patent
Cheng et al.

(10) Patent No.: US 7,248,993 B2
(45) Date of Patent: Jul. 24, 2007

(54) METHOD FOR MEASURING REMAINING HYDROGEN CAPACITY OF HYDROGEN STORAGE CANISTER

(75) Inventors: Yaw-Chung Cheng, Taipei (TW); Yao-Sheng Hsu, Taipei (TW)

(73) Assignee: Asia Pacific Fuel Cell Technologies, Ltd., Miaoli (TW)

( * ) Notice: Subject to any disclaimer, the term of this patent is extended or adjusted under 35 U.S.C. 154(b) by 0 days.

(21) Appl. No.: 11/404,811

(22) Filed: Apr. 17, 2006

(65) Prior Publication Data

US 2006/0243025 A1 Nov. 2, 2006

(30) Foreign Application Priority Data

Apr. 29, 2005 (TW) ............................ 94114039 A

(51) Int. Cl.
*F17C 1/00* (2006.01)
(52) U.S. Cl. .................... 702/156; 702/24; 702/23; 73/23.2
(58) Field of Classification Search ............ 702/156, 702/24
See application file for complete search history.

(56) References Cited

U.S. PATENT DOCUMENTS

| | | | |
|---|---|---|---|
| 5,932,365 A * | 8/1999 | Lin et al. ................. 429/12 |
| 2003/0070487 A1 * | 4/2003 | DaCosta et al. ........... 73/708 |
| 2003/0192779 A1 * | 10/2003 | Cheng ..................... 204/266 |
| 2004/0142222 A1 * | 7/2004 | Yang et al. ................ 429/26 |

* cited by examiner

*Primary Examiner*—Hal Wachsman
(74) *Attorney, Agent, or Firm*—Rosenberg, Klein & Lee

(57) ABSTRACT

Disclosed is a method for measuring the available remaining hydrogen capacity of a non-replaced hydrogen storage canister. After the original hydrogen capacity of the hydrogen storage canister is read, the used hydrogen capacity of the hydrogen storage canister is read and remaining hydrogen capacity formula is employed to determine the available remaining hydrogen capacity of the hydrogen storage canister. For a fully charged or newly-installed hydrogen storage canister, the process includes reading the number of cycles of operation of the hydrogen storage canister, reading the original hydrogen capacity of the hydrogen storage canister, reading the used hydrogen capacity of the hydrogen storage canister, and then employing the remaining hydrogen capacity formula to determine the available remaining hydrogen capacity of the hydrogen storage canister.

7 Claims, 5 Drawing Sheets

METHOD FOR MEASURING REMAINING HYDROGEN CAPACITY OF HYDROGEN STORAGE CANISTER

FIELD OF THE INVENTION

The present invention relates to measurement of hydrogen capacity of hydrogen storage canister, and in particular to a method for measuring remaining hydrogen capacity of hydrogen storage canister.

BACKGROUND OF THE INVENTION

Hydrogen containers or storage canisters are widely used in for example hydrogen powered vehicles, hydrogen fuel cell systems and related products thereof, and hydrogen generation systems for storage of hydrogen. Currently, mass storage of hydrogen takes three forms including liquid form, high-pressure gas form and low-pressure metal hydrides. Among the three forms the solid metal hydride is the best option in respect of operation safety.

Metal alloys used to store hydrogen in room temperature and low-pressure conditions include TiFe alloy, $LaNi_5$ alloy, and Mg alloy (all of which are in powder form.) These powders are contained in a storage canister for ease of usage and carrying. The storage canister must be properly charged with hydrogen gas before usage and a discharge process must be carried out to release hydrogen from the storage canister to supply for example a hydrogen engine or a hydrogen fuel cell.

In practical operation of the hydrogen storage canister, the available remaining amount of hydrogen remaining in the hydrogen storage canister must be constantly monitored in order to timely recharge the hydrogen storage canister with hydrogen. For example, for a portable fuel cell power generator that obtains hydrogen supply from a hydrogen storage canister, or for an electrical motorcycle/bicycle powered by hydrogen, a user must keep aware of the remaining amount of hydrogen inside the hydrogen storage canister in order to determine the time period within which the device is still operable with proper supply of hydrogen or to determine the time to recharge the hydrogen storage canister with hydrogen or to replace the hydrogen storage canister with a new or a fully charged one.

The performance of a solid alloy powder hydrogen storage is often indicated by a PCT curved that involves the parameters including operation pressure, operation temperature and hydrogen capacity. FIG. 1 of the attached drawings shows PCT curves of TiFe alloy for the storage of hydrogen in different temperatures, while FIG. 2 shows similar curves for $LaNi_5$ alloy in different temperatures. In these drawings, abscissa indicates the hydrogen capacity, and ordinate indicates the relief pressure (atm) of hydrogen gas.

It is clear from the curves of FIGS. 1 and 2 that except for extremely high and low pressures zones the characteristic curves of hydrogen are quite flat with respect to the capacity. In other words, measuring pressure change cannot properly tell the capacity change of a hydrogen storage canister. Further, although the curves of hydrogen capacity are sensitive to temperature, their change with respect to temperature is substantially regular. However, since the hydrogen capacity is also subject to change of pressure, there is no way to determine the hydrogen capacity by simply measuring temperature.

It is very common in laboratories that to determine the hydrogen capacity of a hydrogen storage canister by measuring weight difference; this needs precision instrument to perform precise measurement of the weight of the hydrogen container and calculate the difference between successive measurements to estimate an approximation of available hydrogen capacity for the particular hydrogen container. However, in practical applications, besides the hydrogen container itself, a hydrogen storage/supply system also includes a plurality of related parts/members/components, such as heat exchanger water jacket, fast connector, and cooling water, and variation of overall system weight is great between different systems. Furthermore, installation of weighing devices complicates the construction of whole system. All these factors make it very difficult to estimate hydrogen capacity by weight measuring in most of the practical applications.

In addition, actual hydrogen capacity of solid metal alloy hydrogen storage varies with the purity of hydrogen stored and the poisoning of alloy. Besides, the hydrogen capacity reduces with the operation cycles of charging/discharging of hydrogen. Moreover, what is actually needed is the available remaining hydrogen capacity of a hydrogen storage canister, rather than the overall hydrogen capacity of hydrogen storage canister. The actual available remaining hydrogen capacity is related to the temperature of the hydrogen storage canister, actual hydrogen pressure used, and the flow rate of hydrogen.

Heretofore, no efficient and precise method or device is available for commercial use in measuring the hydrogen capacity of a hydrogen storage canister. This delays the promotion of use of hydrogen in different applications including fuel cells and fuel cell powered electrical vehicles.

Thus, the present invention is aimed to overcome the above-discussed difficulty and to provide a useful method for practically determining the hydrogen storage.

SUMMARY OF THE INVENTION

Thus, an objective of the present invention is to provide an effective method for measuring the hydrogen capacity of a hydrogen storage canister, which measures available remaining hydrogen capacity of a used hydrogen storage canister or a newly installed hydrogen storage canister.

Another objective of the present invention is to provide a method for measuring available remaining hydrogen capacity of a hydrogen storage canister, which eliminates the drawbacks of conventional method that measures hydrogen capacity of hydrogen storage alloy by simply measuring pressure or temperature.

A further objective of the present invention is to provide a method for measuring the available remaining hydrogen capacity of a hydrogen storage canister that overcomes the disadvantage of significant measurement error occurring in the conventional weight difference measuring methods and is thus applicable in commercial operation purposes.

The solution of the present invention that is aimed to solve the problems of the conventional methods is, after reading hydrogen capacity of a hydrogen storage canister, to obtain the used hydrogen capacity of the hydrogen storage canister and employing formula of available remaining hydrogen capacity to calculate out the available remaining hydrogen capacity of the hydrogen storage canister. For a fully-recharged or newly-installed hydrogen storage canister, the method of the present invention comprises reading the number of operation cycles of the hydrogen storage canister, reading the hydrogen capacity of the hydrogen storage canister, reading the used hydrogen capacity of the hydrogen storage canister and then using the formula of available remaining hydrogen capacity to calculate the available remaining hydrogen capacity of the hydrogen storage canister. In a preferred embodiment, a hydrogen capacity deterioration curve is employed to calculate the available hydrogen capacity of the hydrogen storage canister. The present invention also comprises steps of measuring the operation temperature of the hydrogen storage canister and calculating the available temperature-calibrated hydrogen capacity for the hydrogen storage canister.

The method of the present invention eliminates the drawbacks of the conventional methods that simply measure pressure, temperature, or weight difference of hydrogen so as to overcome the difficult of measurement error occurring in the conventional methods. Further, the present invention can be easily applicable in practical industrial operations to provide efficient, precise and application-satisfied technology of hydrogen capacity measurement, which is of great help for the promotion of fuel cell systems, fuel cell powered electrical vehicles, as well as development thereof.

BRIEF DESCRIPTION OF THE DRAWINGS

The present invention will be apparent to those skilled in the art by reading the following description of the best mode for carrying out the invention, with reference to the attached drawings, in which.

DETAILED DESCRIPTION OF THE PREFERRED EMBODIMENTS

Figure 1:
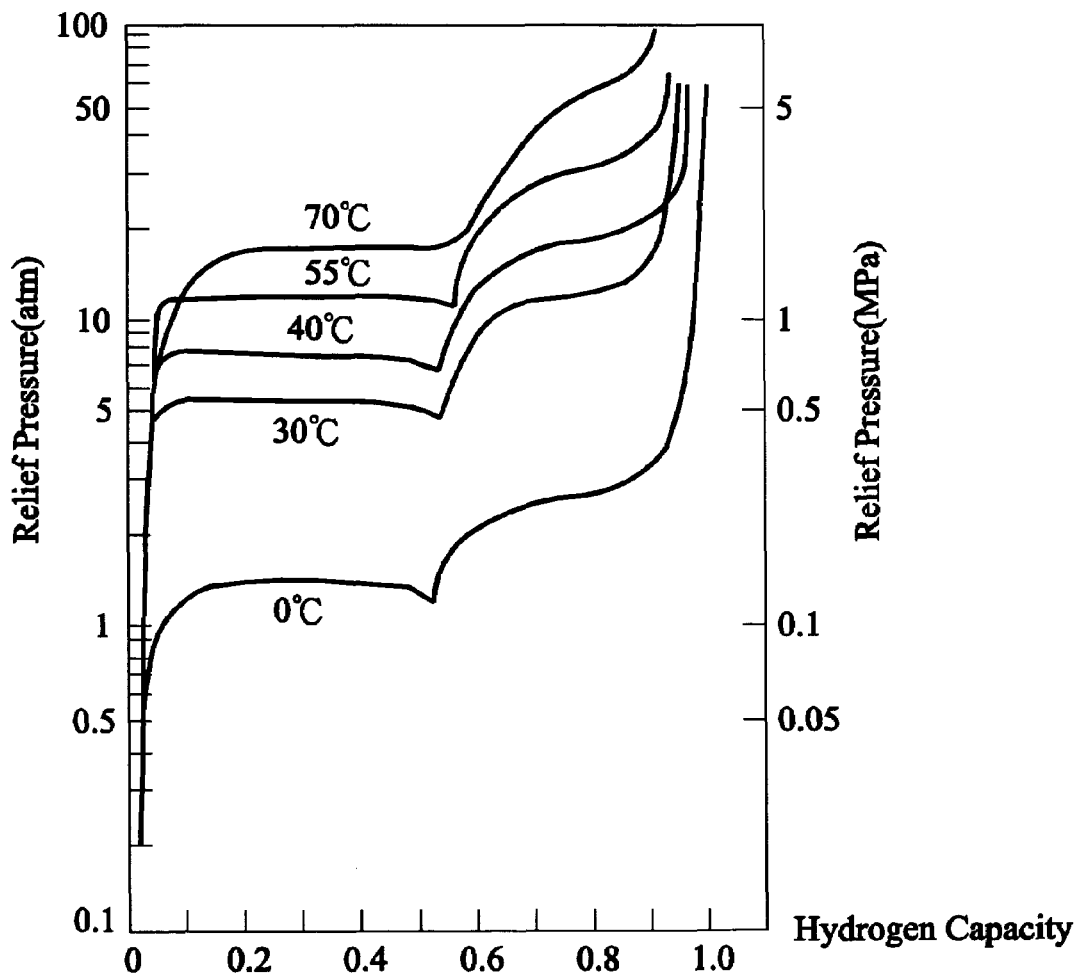
FIG. 1 is a plot showing pressure/capacity/temperature PCT curves for TiFe alloy in different temperatures of the prior art.
Figure 2:
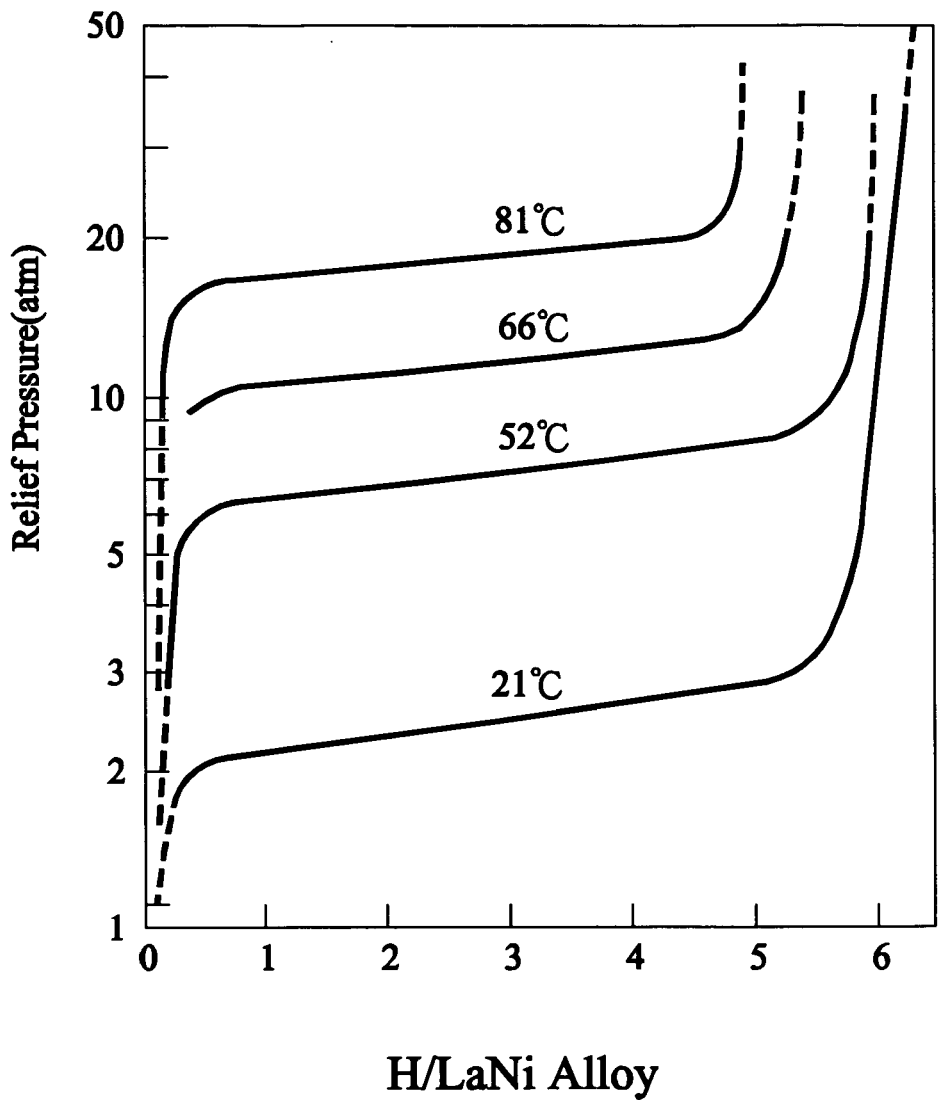
FIG. 2 is a plot showing pressure/capacity/temperature PCT curves for $LaNi_5$ alloy in different temperatures of the prior art.
Figure 3:
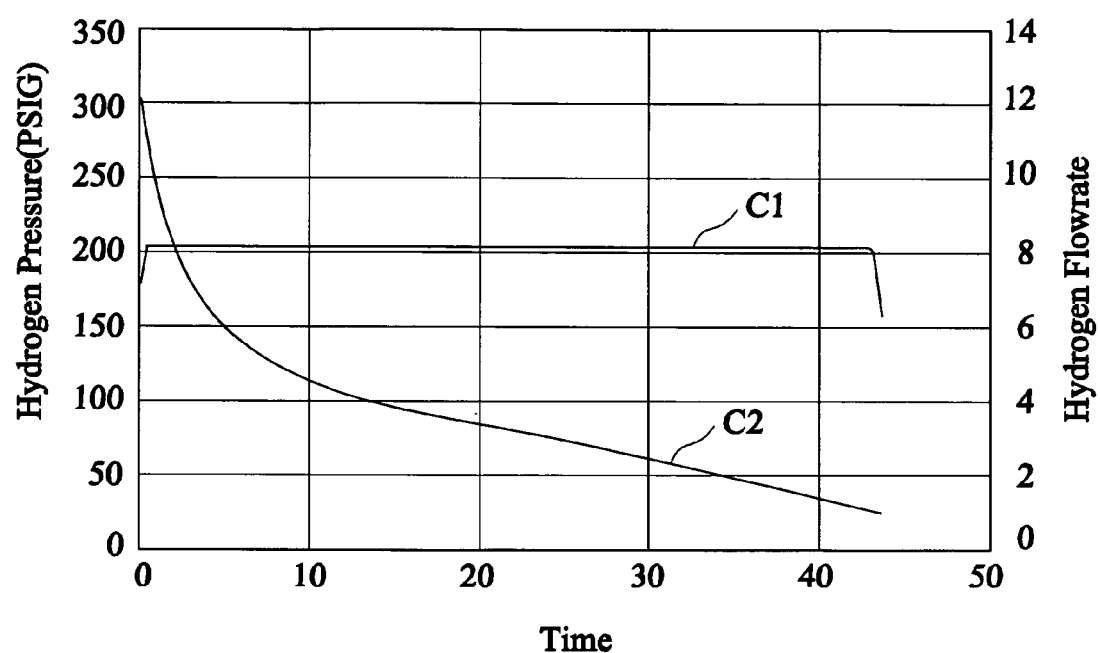
FIG. 3 is a plot showing dynamic discharge of characteristic curves of pressure and flow rate vs. time elapse for a hydrogen storage canister.

Before explanation of the method for measuring the available remaining hydrogen capacity of a hydrogen storage canister in accordance with the present invention, the variation of hydrogen capacity of the hydrogen storage canister in actual applications is discussed first. Experiments have been performed, in which hydrogen storage canisters that are charged with hydrogen under fixed conditions are put in different operation temperatures and hydrogen is released according to hydrogen pressure and minimum hydrogen flow rate required by applications with the flow rate of hydrogen being read by mass flow meters whereby characteristic curves (see FIG. 3) of hydrogen flow rate and hydrogen pressure vs. time for actual applications can be obtained. In FIG. 3, curve C1 is a flow rate curve, and curve C2 is a hydrogen pressure curve. In this way, effective hydrogen capacity in different operation temperatures can be obtained, based on which, calibration can be performed to assess the actual hydrogen capacity of the hydrogen storage canister.

Figure 4:
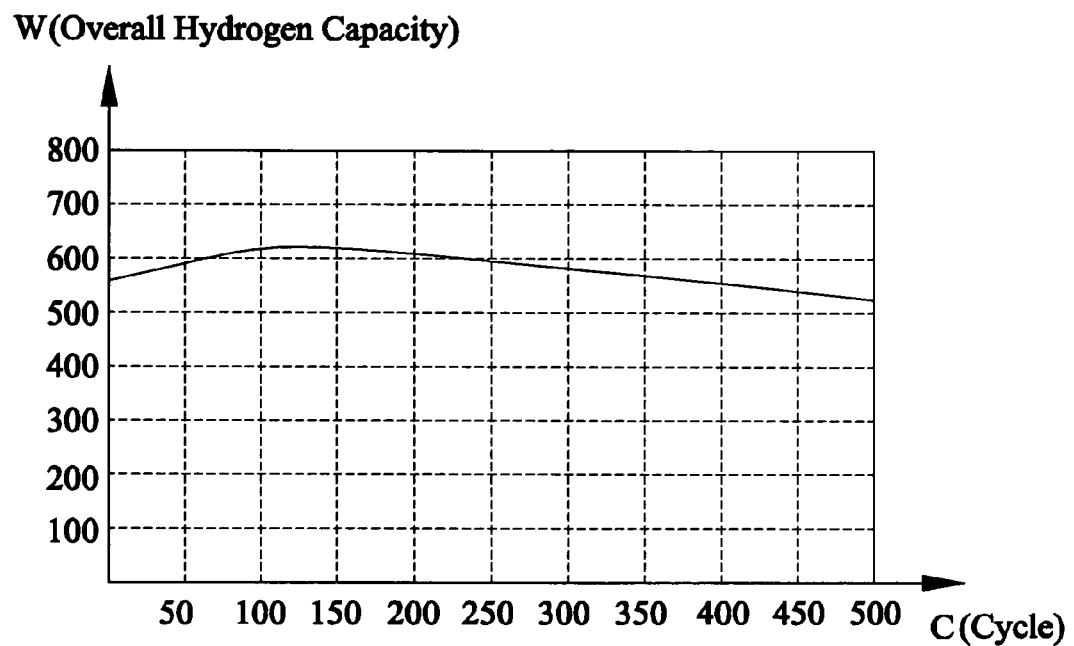
FIG. 4 is a plot of a hydrogen capacity deterioration curve for a hydrogen storage canister after 500 cycles of operation.

Further, impurity contained in hydrogen may reduce the overall hydrogen capacity of the hydrogen storage canister after cycles of operation. Thus, experiments must be carried out to determine the variation of hydrogen capacity caused by the impurity in advance. For example, in FIG. 4, a deterioration curve of hydrogen capacity is shown, which illustrates that after 500 cycles of charging/discharging of hydrogen, the hydrogen capacity of the hydrogen storage canister in test reduces approximately 5%.

In practical applications, the type and amount of hydrogen storage alloy filled in a particular hydrogen storage canister are known and fixed. Thus, hydrogen releasing characteristics and deterioration of hydrogen capacity of the particular hydrogen storage canister are also known. Then, the following formula can be used to determine the available remaining hydrogen capacity of the hydrogen storage canister:

$$C_{ac,\ t=0,\ s=0} = C_{oc}(T, N) = C_{ac,\ t=0,\ s=1} \quad (1)$$

$$C_{ac,\ t=0,\ s=1} = C_{ac}(T) \quad (2)$$

$$C_{ac,\ t=t,\ s=1} = C_{ac,\ t=t-1,\ s=1} - C_{us,\ t=t} \quad (3)$$

where:

$C_{oc}$=original hydrogen capacity of fully charged hydrogen storage canister or newly installed hydrogen storage canister;

$C_{ac}$=available remaining hydrogen capacity of hydrogen storage canister;

$C_{uc}$=used hydrogen capacity of hydrogen storage canister;

T=operation temperature of hydrogen storage canister;

N=number of operation cycles of hydrogen storage canister;

S=replacement status of hydrogen storage canister, S=0 indicating newly replaced; S=1 indicating no replacement; and t=time elapse of operation of hydrogen storage canister.

According to equations (1) to (3), as well as the known characteristic curves of hydrogen release and hydrogen capacity deterioration, the available hydrogen capacity of a hydrogen storage canister can be easily calculated.

Figure 5:
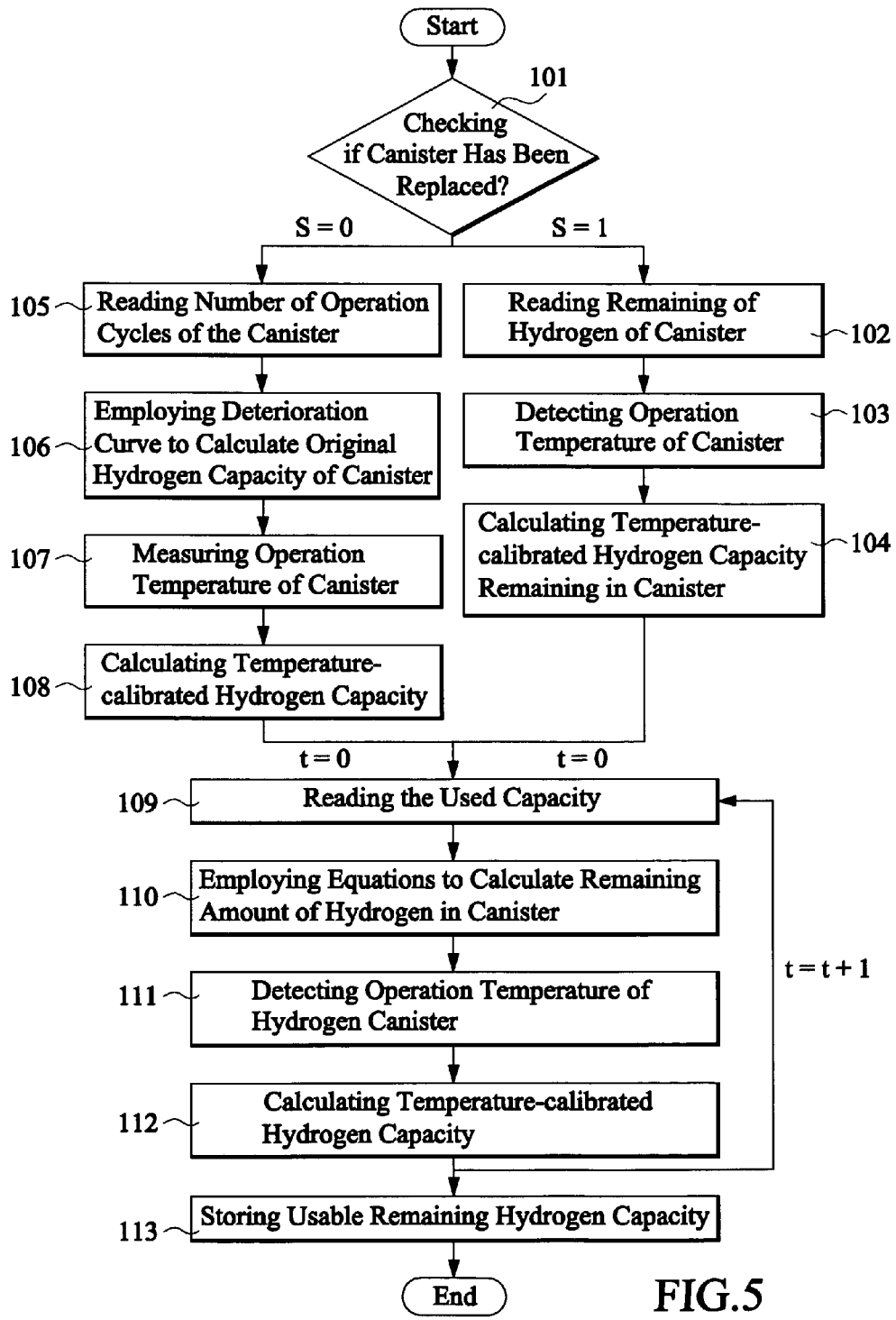
FIG. 5 is a flow chart of a method for measuring available remaining hydrogen capacity of a hydrogen storage canister in accordance with the present invention.

FIG. 5 shows a flow chart of the method in accordance with the present invention in determining the available remaining hydrogen capacity of the hydrogen storage canister, which will be explained with reference to the above illustrated equations (1) and (2). In the method of the present invention, the replacement status of the hydrogen storage canister is first determined by checking if the hydrogen storage canister has been replaced or has not been replaced, step 101. If the hydrogen storage canister has not been replaced, then the amount of hydrogen of the hydrogen storage canister is read, step 102. In step 103, the operation temperature of the hydrogen storage canister is measured and is used to calculate out a temperature-calibrated hydrogen capacity of hydrogen remaining in the hydrogen storage canister, step 104.

If, in step 101, it is determined that the hydrogen storage canister has been replaced by a new one, then the number (N) of operation cycles of the hydrogen storage canister is read, step 105, and then the deterioration curve is employed to calculate the original hydrogen capacity of the hydrogen storage canister ($C_{oc}$), step 106. Thereafter, the operation temperature T of the hydrogen storage canister is measured, step 107, and a temperature-calibrated hydrogen capacity is calculated, step 108.

Thereafter, in step 109, the used hydrogen capacity ($C_{uc}$) is read, and the above equations are employed to calculate the remaining amount of hydrogen in the hydrogen storage canister, step 110.

Thereafter, operation temperature T of the hydrogen storage canister is measured, step 111. And temperature-calibrated hydrogen capacity is calculated, step 112.

The steps (steps 109-112) of the above described process are repeated several times and then the available remaining hydrogen capacity ($C_{ac}$) is stored, step 113. The process is thus completed.

The process illustrated in FIG. 5 can be simplified for practical applications. For example, in applications where operation temperature of the hydrogen storage canister does not vary a lot, then a constant temperature operation can be assumed. In this condition, no temperature calibration is needed and steps 103, 107, 111 are eliminated.

Further, in case of excellent purity and quality of hydrogen, the deterioration of hydrogen capacity caused by repeated charging/discharging of the hydrogen storage canister can be regarded as being less than 5% within 500 cycles of operation. In this condition, the correction due to deterioration, step 106, can be further eliminated. Or alternatively, an averaged deterioration of 2.5% can be used for the initial 500 cycles of operation.

Based on the above process and calculation, the present invention provides a module for calculation and display of available remaining hydrogen capacity for a give hydrogen storage canister. For a system comprising a number of hydrogen storage canisters, each hydrogen storage canister can be provided with the remaining hydrogen capacity calculation/display module, or preferably, a management system for multiple hydrogen storage canisters can be provided. A different way is to provide a single remaining hydrogen capacity calculation/display module for a combination of multiple hydrogen storage canisters, wherein replacement or charging of all the hydrogen storage canisters is done simultaneous for all hydrogen storage canisters.

Although the present invention has been described with reference to the best mode for carrying out the present invention, it is apparent to those skilled in the art that a variety of modifications and changes may be made without departing from the scope of the present invention that is intended to be defined by the appended claims.

What is claimed is:

1. A method for measuring remaining hydrogen capacity of a hydrogen storage canister, comprising the following steps:
   (a) determining a hydrogen capacity of the hydrogen storage canister;
   (b) determining a used hydrogen capacity of the hydrogen storage canister;
   (c) calculating the remaining hydrogen capacity of the hydrogen storage canister by employing the following equations:

$$C_{ac,\ t=0,\ s=0} = C_{oc}(T, N) = C_{ac,\ t=0,\ s=1}$$

$$C_{ac,\ t=0,\ s=1} = C_{ac}(T)$$

$$C_{ac,\ t=t,\ s=1} = C_{ac,\ t=t-1,\ s=1} - C_{uc,\ t=t}$$

where:
   $C_{oc}$ = original hydrogen capacity of fully charged hydrogen storage canister or newly installed hydrogen storage canister;
   $C_{ac}$ = available remaining hydrogen capacity of hydrogen storage canister;
   $C_{uc}$ = used hydrogen capacity of hydrogen storage canister;
   T = operation temperature of hydrogen storage canister;
   N = number of operation cycles of hydrogen storage canister;
   S = replacement status of hydrogen storage canister, S=0 indicating newly replaced; S=1 indicating no replacement; and
   t = time elapse (sec) of operation of hydrogen storage canister; and
   (d) displaying the remaining hydrogen capacity of the hydrogen storage canister on a display module.

2. The method as claimed in claim 1, after step (a), further comprising a step of measuring operation temperature of the hydrogen storage canister to calculate available temperature-calibrated hydrogen capacity of the hydrogen storage canister.

3. The method as claimed in claim 1, after step (c), further comprising a step of measuring operation temperature of the hydrogen storage canister to calculate available remaining temperature-calibrated hydrogen capacity of the hydrogen storage canister.

4. A method for measuring remaining hydrogen capacity of a fully-charged/newly-installed hydrogen storage canister, comprising the following steps:
   (a) determining a number of cycles of operation of the hydrogen storage canister;
   (b) determining a hydrogen capacity of the hydrogen storage canister;
   (c) determining used hydrogen capacity of the hydrogen storage canister;
   (d) calculating the remaining hydrogen capacity of the hydrogen storage canister by employing the following equations:

$$C_{ac,\ t=0,\ s=0} = C_{oc}(T, N) = C_{ac,\ t=0,\ s=1}$$

$$C_{ac,\ t=0,\ s=1} = C_{ac}(T)$$

$$C_{ac,\ t=t,\ s=1} = C_{ac,\ t=t-1,\ s=1} - C_{uc,\ t=t}$$

where:
   $C_{oc}$ = original hydrogen capacity of fully-charged/newly installed hydrogen storage canister;
   $C_{ac}$ = available remaining hydrogen capacity of hydrogen storage canister;
   $C_{uc}$ = used hydrogen capacity of hydrogen storage canister;
   T = operation temperature of hydrogen storage canister;
   N = number of operation cycles of hydrogen storage canister;
   S = replacement status of hydrogen storage canister, S=0 indicating newly replaced; S=1 indicating no replacement; and
   t = time elapse (sec) of operation of hydrogen storage canister; and
   (e) displaying the remaining hydrogen capacity of the hydrogen storage canister on a display module.

5. The method as claimed in claim 4, after step (a), further comprising a step of employing a hydrogen capacity deterioration curve to calculate available remaining hydrogen capacity of the hydrogen storage canister.

6. The method as claimed in claim 4, after step (a), further comprising a step of measuring operation temperature of the hydrogen storage canister to calculate available temperature-calibrated hydrogen capacity of the hydrogen storage canister.

7. The method as claimed in claim 4, after step (d), further comprising a step of measuring operation temperature of the hydrogen storage canister to calculate the available remaining temperature-calibrated hydrogen capacity of the hydrogen storage canister.

* * * * *